A. T. BROWN.
GEAR GRINDING MACHINE.
APPLICATION FILED FEB. 13, 1914. RENEWED JULY 15, 1920.

1,352,872.

Patented Sept. 14, 1920.
14 SHEETS—SHEET 3.

A. T. BROWN.
GEAR GRINDING MACHINE.
APPLICATION FILED FEB. 13, 1914. RENEWED JULY 15, 1920.
1,352,872.
Patented Sept. 14, 1920.
14 SHEETS—SHEET 4.
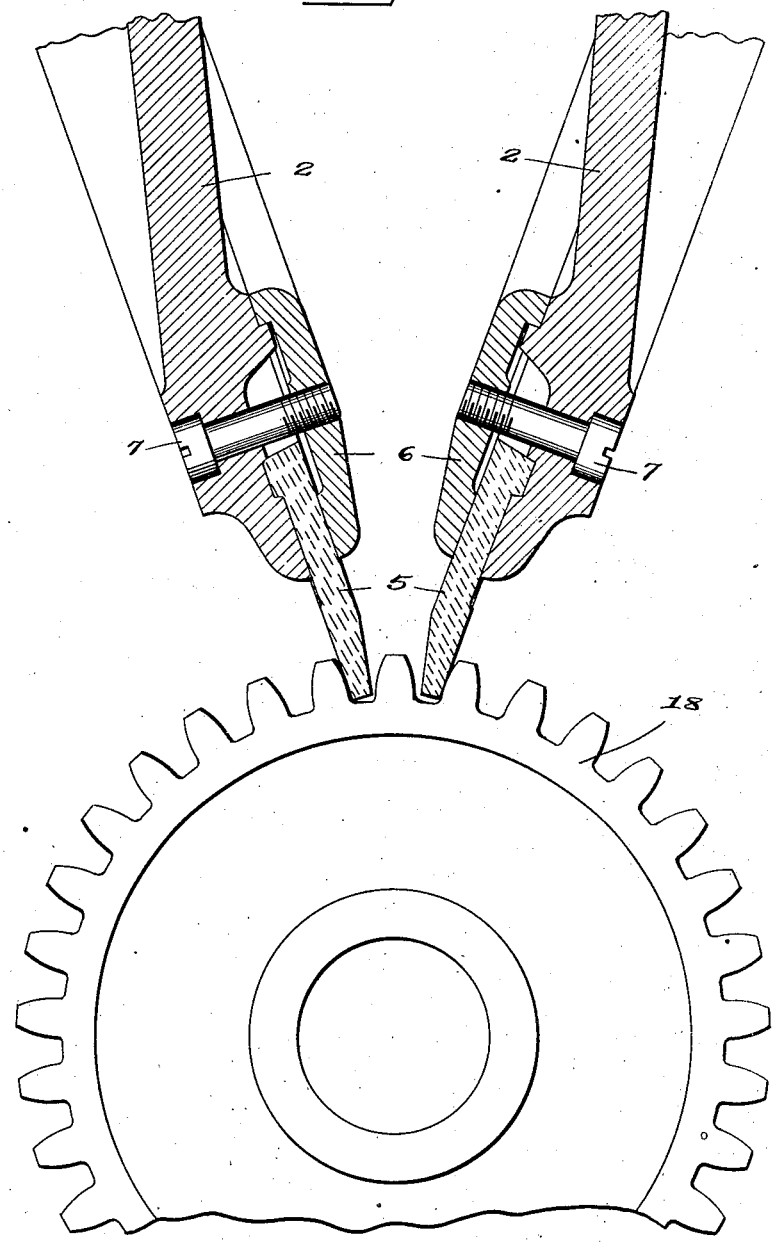

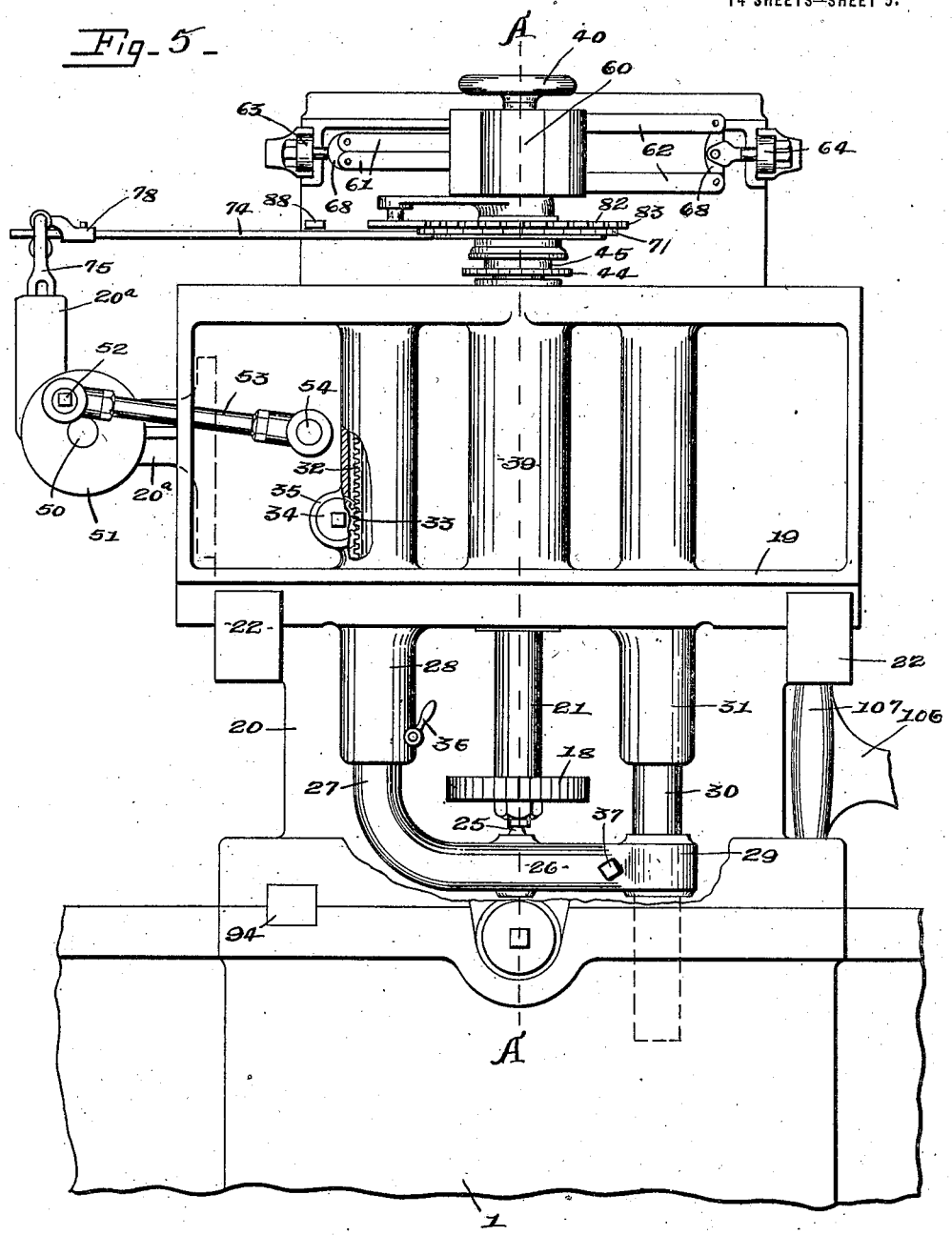

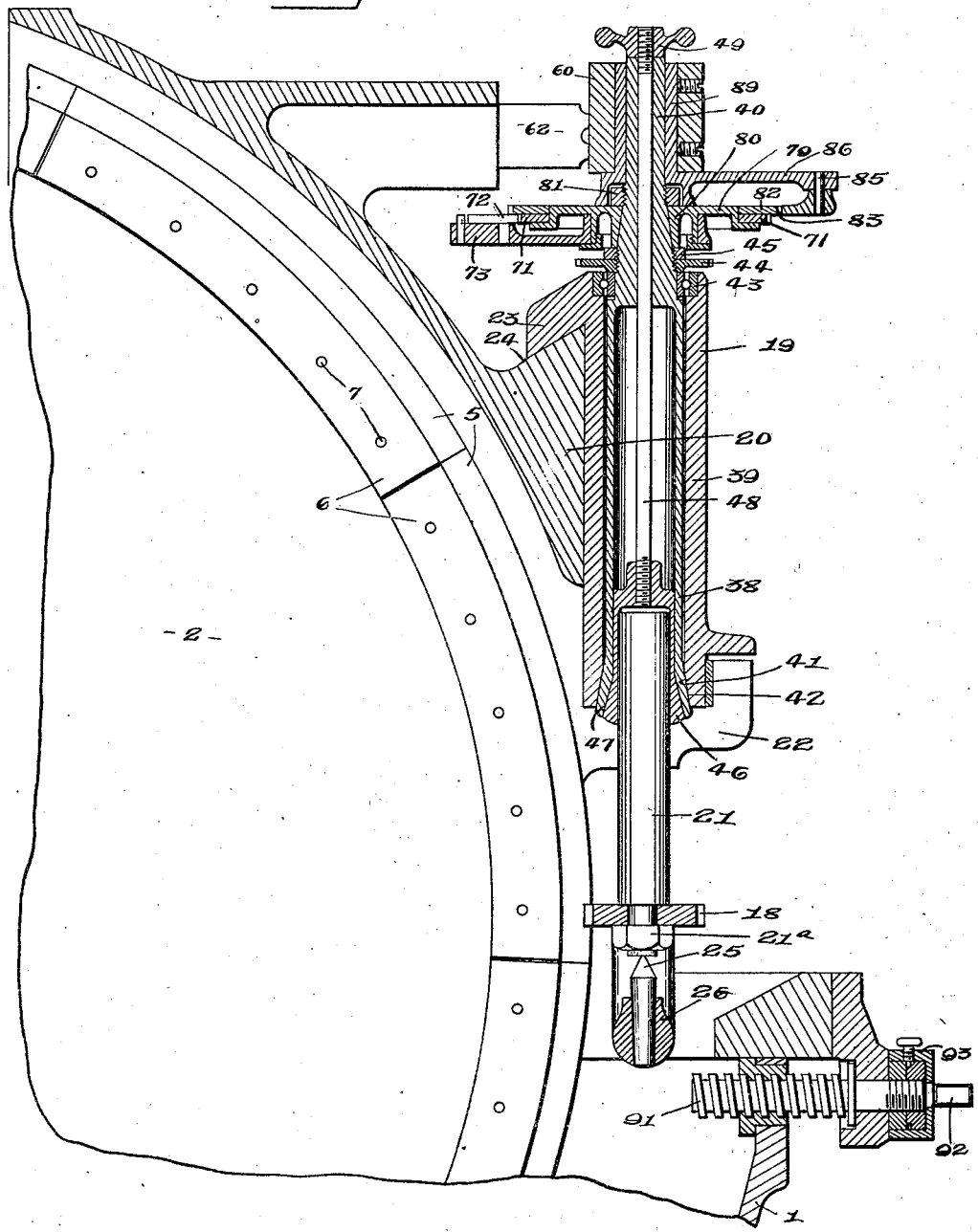

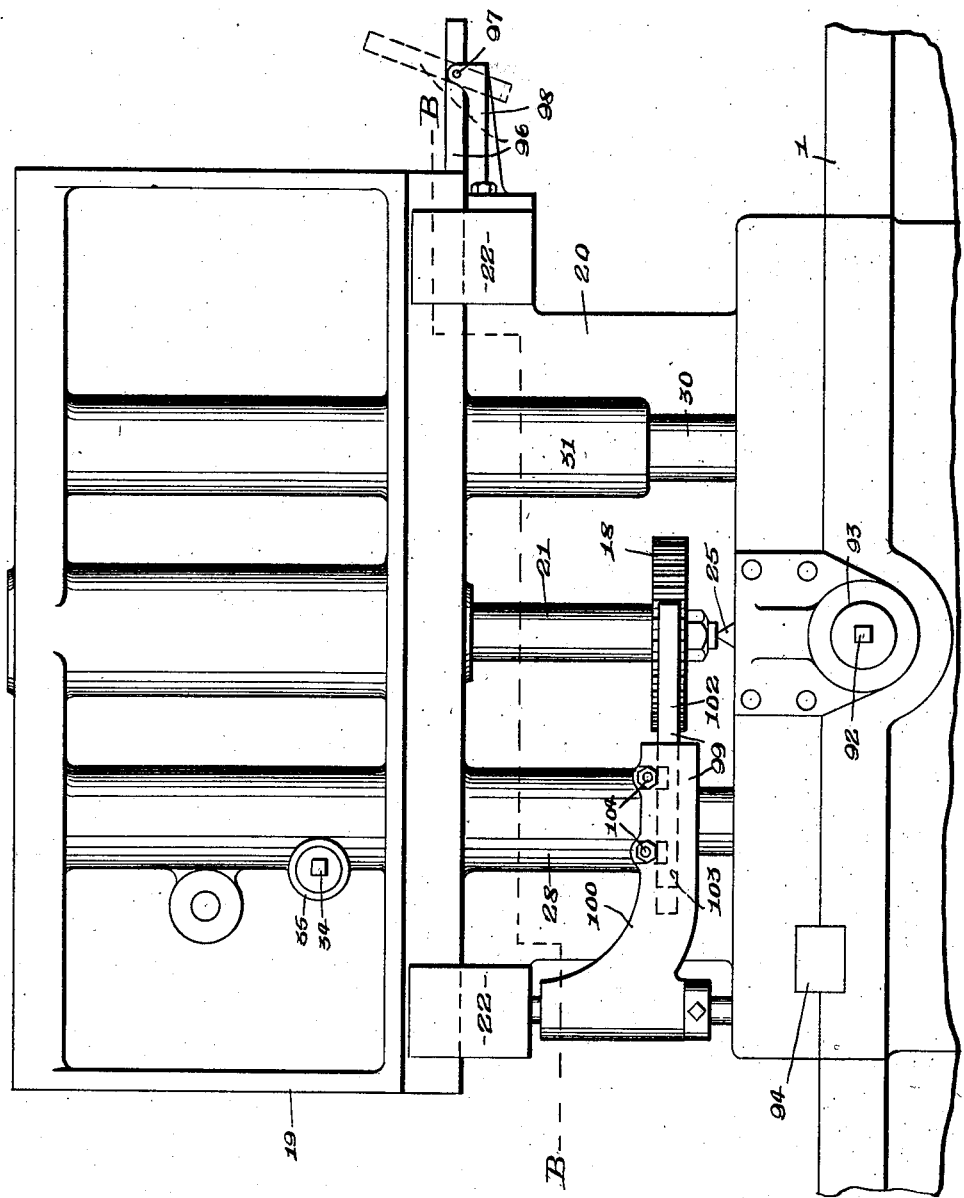

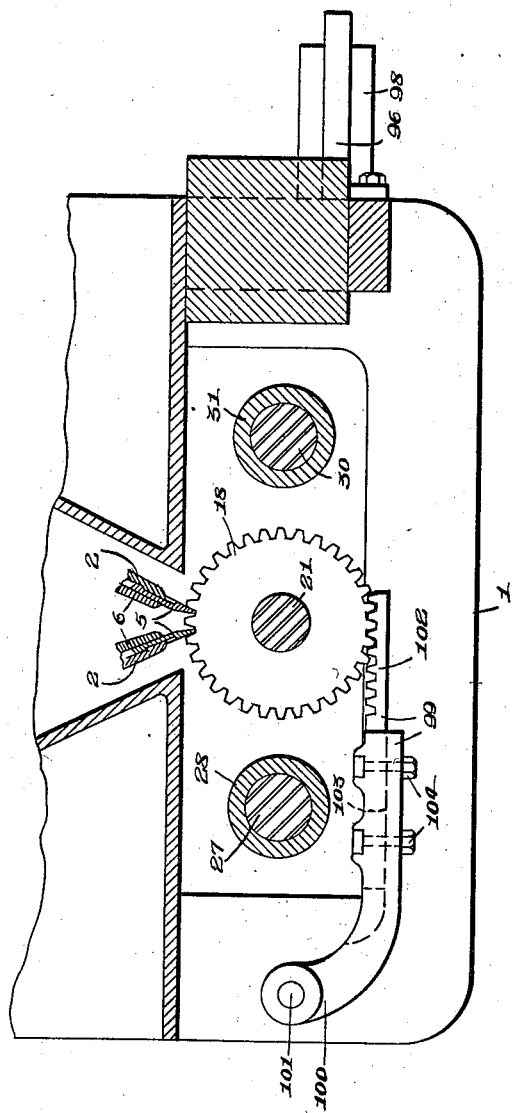

A. T. BROWN.
GEAR GRINDING MACHINE.
APPLICATION FILED FEB. 13, 1914. RENEWED JULY 15, 1920.
1,352,872.
Patented Sept. 14, 1920.
14 SHEETS—SHEET 9.
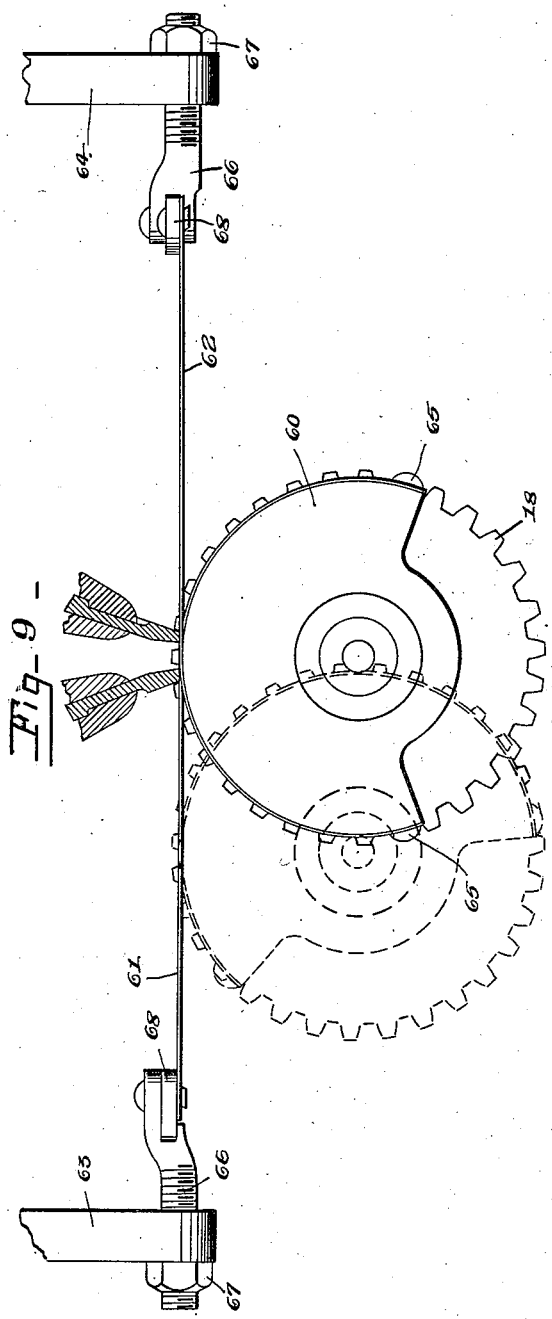
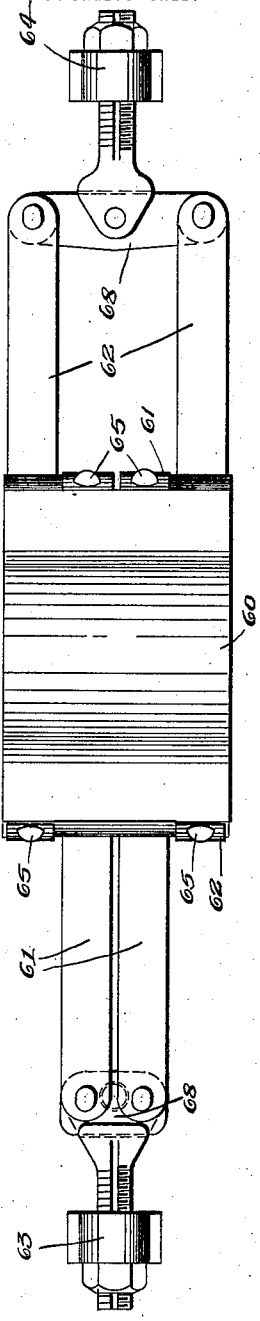
WITNESSES:

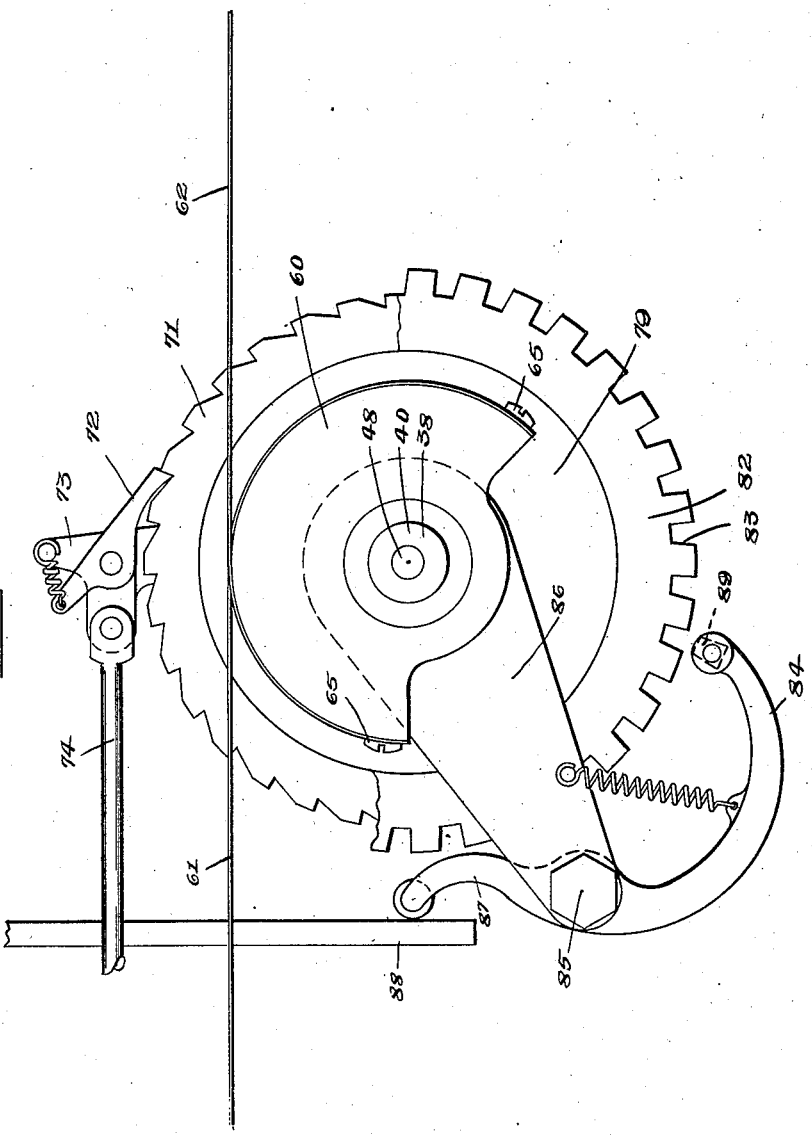

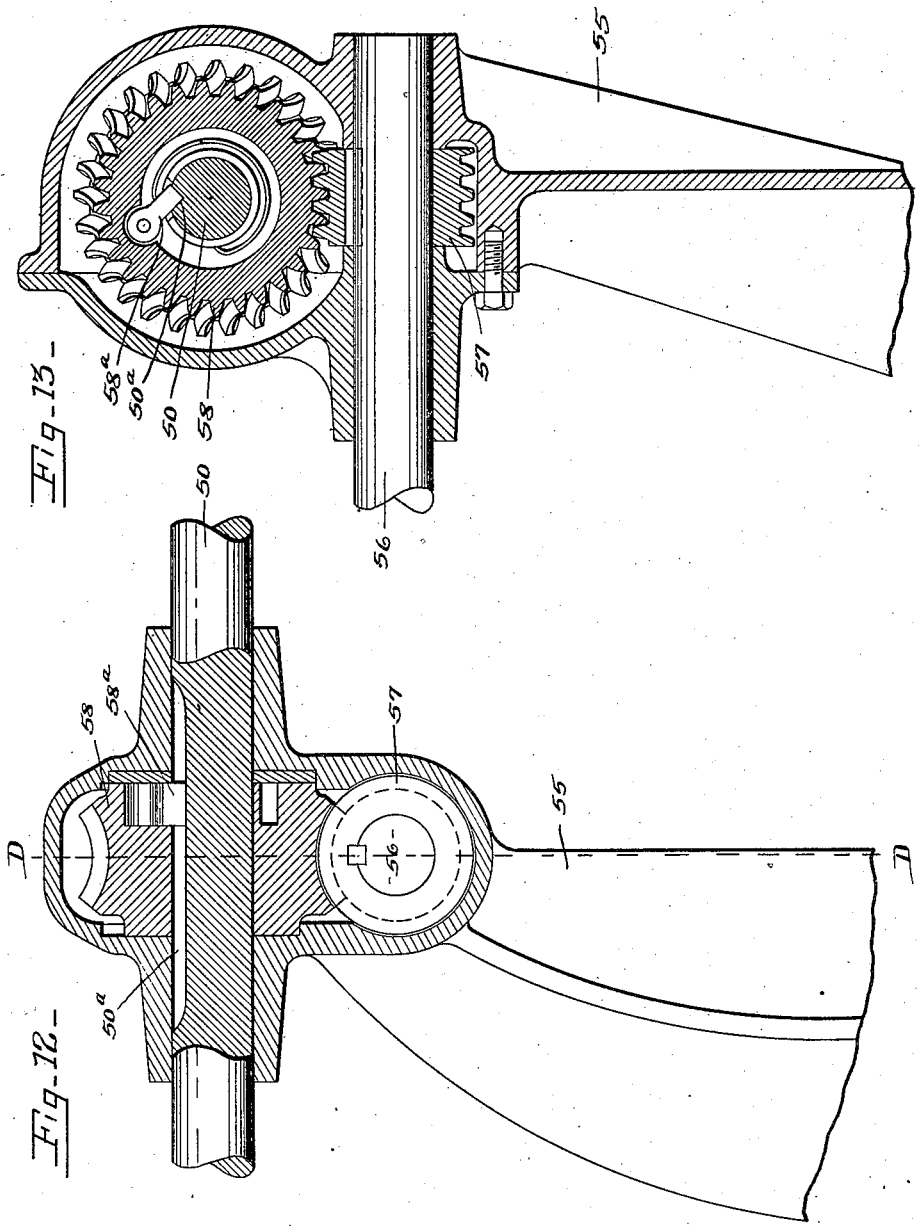

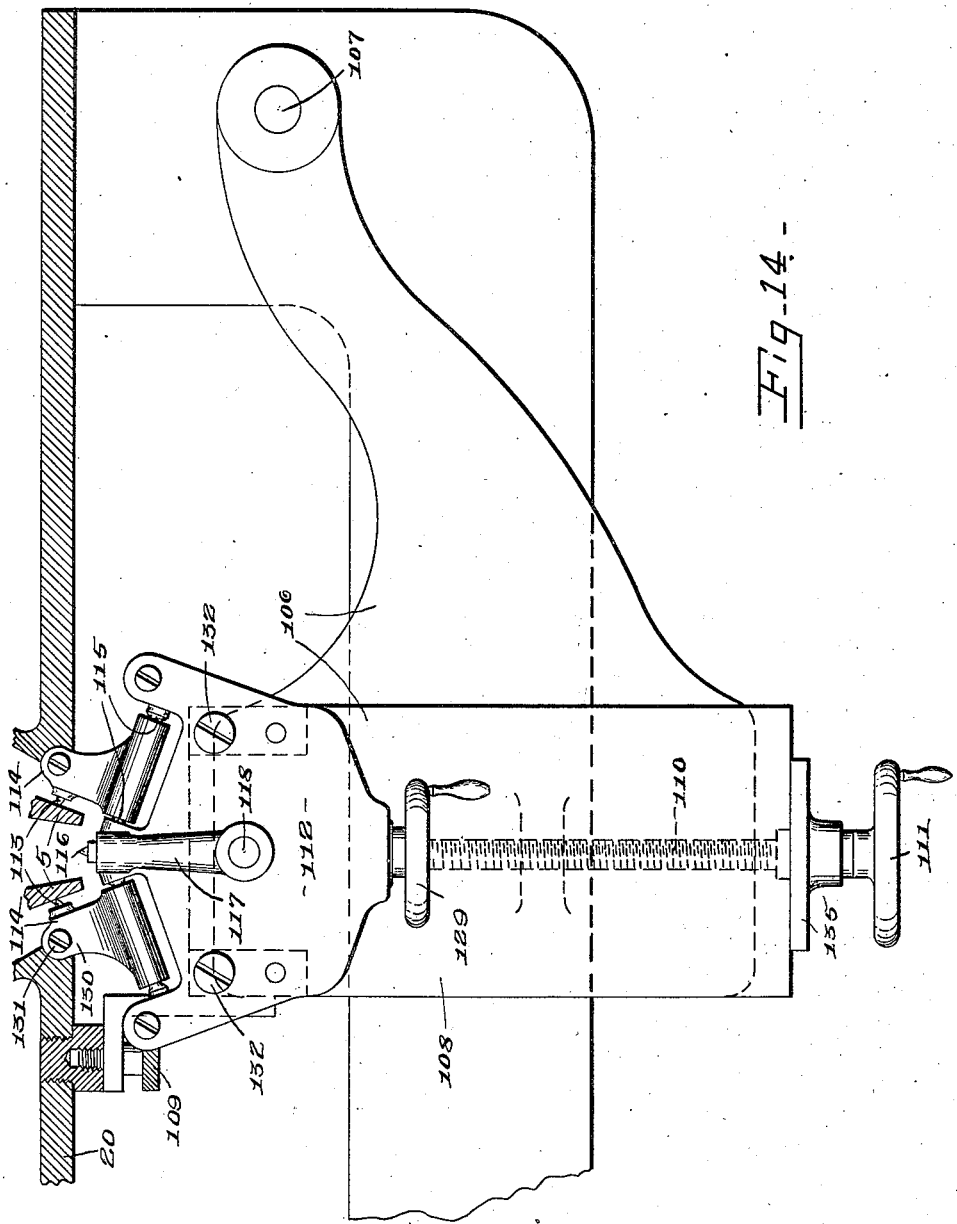

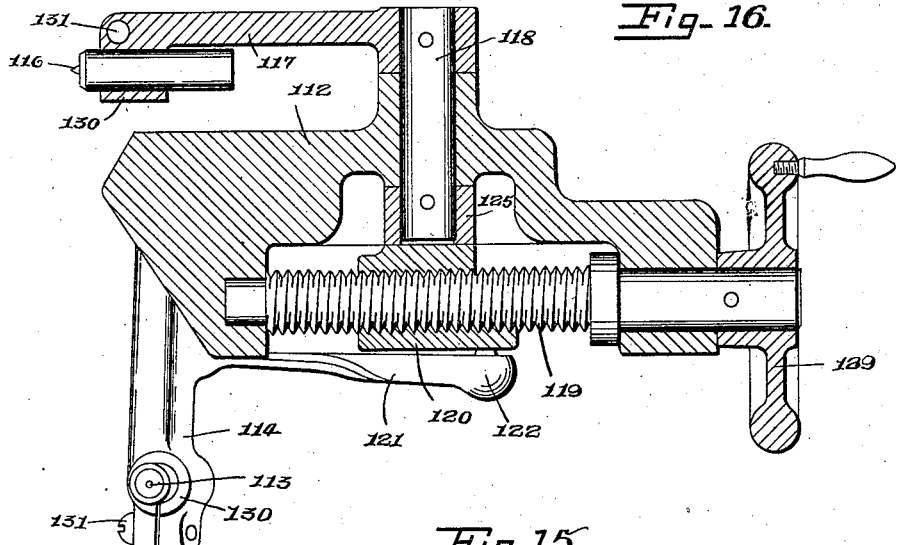
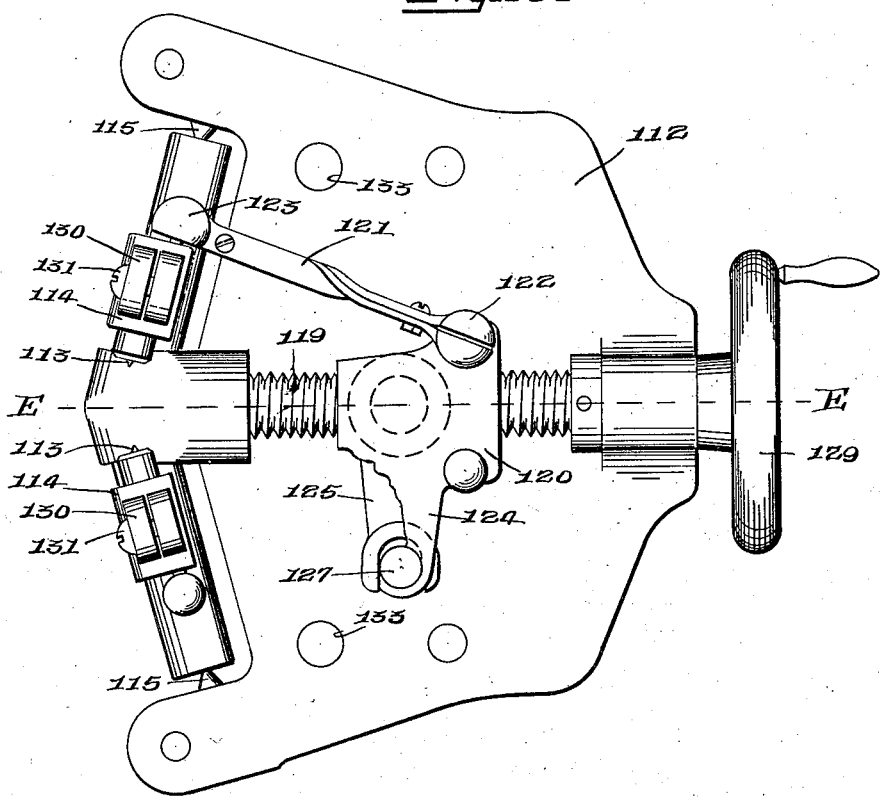

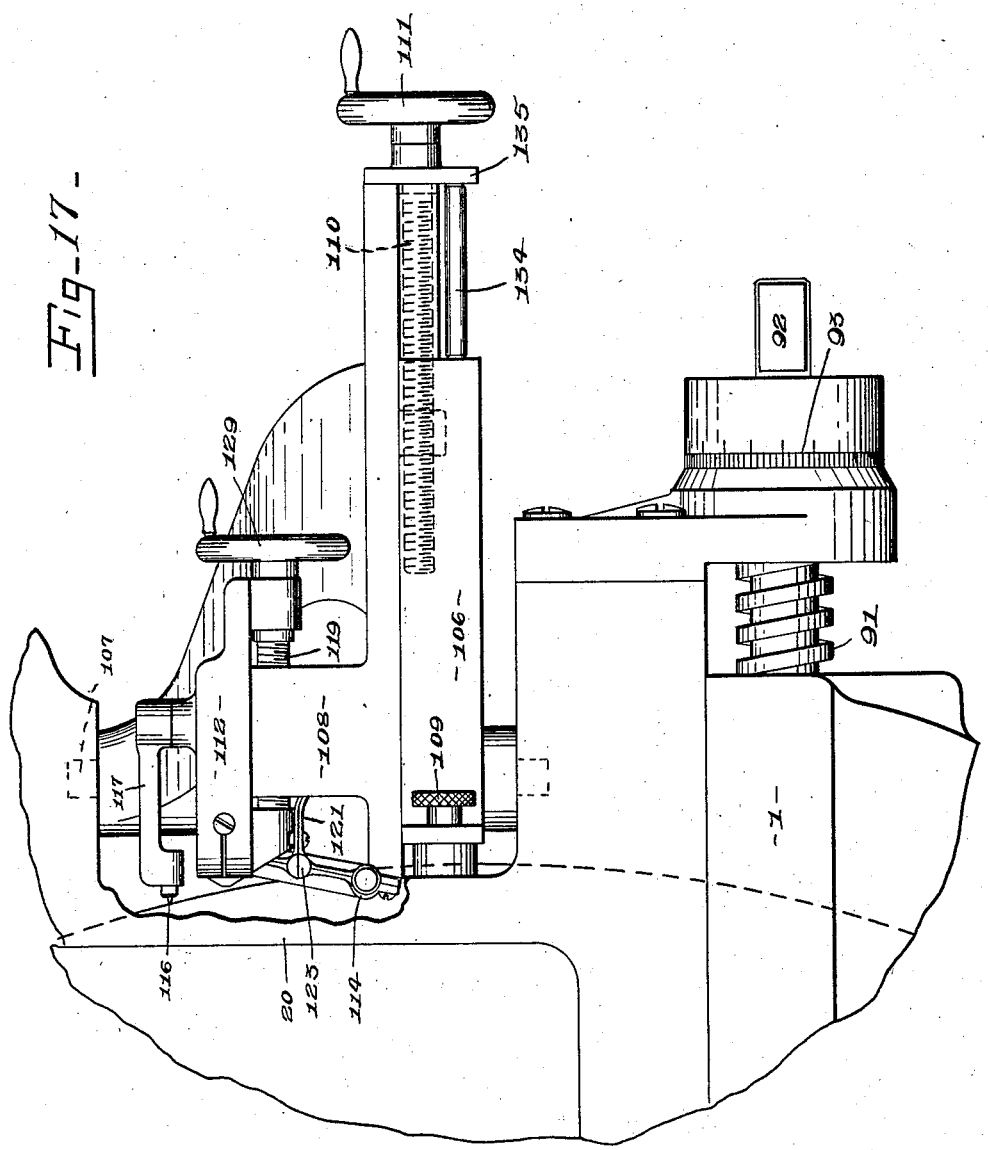

UNITED STATES PATENT OFFICE.

ALEXANDER T. BROWN, OF SYRACUSE, NEW YORK, ASSIGNOR TO THE BROWN-LIPE GEAR COMPANY, OF SYRACUSE, NEW YORK, A CORPORATION OF NEW YORK.

GEAR-GRINDING MACHINE.

1,352,872.                   Specification of Letters Patent.     Patented Sept. 14, 1920.

Application filed February 13, 1914, Serial No. 818,473. Renewed July 15, 1920. Serial No. 396,613.

*To all whom it may concern:*

Be it known that I, ALEXANDER T. BROWN, a citizen of the United States, and a resident of Syracuse, in the county of Onondaga and State of New York, have invented a certain new and useful Gear-Grinding Machine, of which the following is a specification.

This invention has for its object the production of a machine for grinding the teeth of gears, which is particularly simple in construction and highly efficient, rapid and accurate in operation; and it consists in the combinations and constructions hereinafter set forth and claimed.

In describing this invention, reference is had to the accompanying drawings, in which like characters designate corresponding parts in all the views.

Fig. 4 is an enlarged fragmentary view illustrating the operation of the grinders on a gear.

Fig. 5 is an enlarged front elevation of a portion of the machine.

Fig. 6 is a sectional view on line A—A, Fig. 5.

Fig. 7 is an enlarged front elevation of the gear carriage, showing the means or gage for determining the initial position of the gear to be ground.

Fig. 8 is a section on line B—B, Fig. 7.

Fig. 9 is an enlarged detail view illustrating the means for rolling the gear.

Fig. 10 is a front elevation of parts seen in Fig. 9.

Fig. 11 is a fragmentary plan view of a portion of the means for rotating the gear to bring new teeth thereof into grinding position.

Fig. 12 is an enlarged sectional view, partly in elevation, on line C—C, Fig. 2.

Fig. 13 is a section on line D—D, Fig. 12.

Fig. 14 is a plan view of the trimmer for the grinders.

Fig. 15 is an inverted plan of the carriage for the cutting tools of the trimmer.

Fig. 16 is a sectional view on line E—E, Fig. 15.

Fig. 17 is a fragmentary end elevation of the gear carriage showing the trimmer in its position assumed when trimming the grinders.

Figure 1:
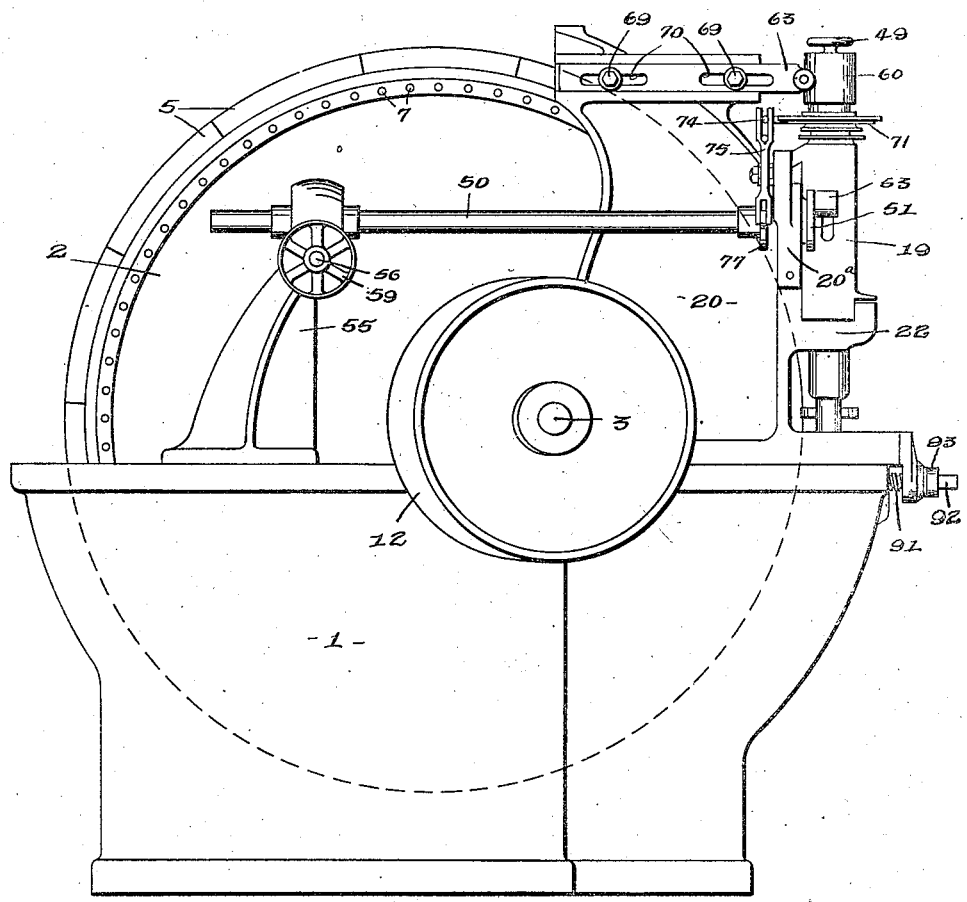
Figure 1 is a side elevation of a machine embodying my invention.

This gear grinding machine comprises, generally, a movable grinder, a gear carriage arranged to hold the gear with the working face of a tooth thereof engaged with the grinder, and means for effecting a rolling movement of the gear and grinder simulating the action of intermeshing gear teeth during the grinding operation.

In the illustrated embodiment of my invention, two grinders are used, which are in the form of wheels having peripheral strips of abrading material engaging side faces of two of the gear teeth; and the gear is supported on a carriage which moves crosswise of the grinders, and means is provided for rolling the gear during the travel of the carriage. This rolling movement of the gear with teeth thereof engaged, or meshing with, portions of the grinders, simulates the action of two intermeshing gears and hence the teeth of the gear are ground off to the proper curve to coact most efficiently and with minimum friction with a companion gear similarly ground, it being understood that the side faces of the grinders are trimmed to the tooth it is desired to produce. As but two teeth of the gear are engaged with the grinders, the rolling is slight.

The movement of the carriage and the rolling of the gear moves the gear clear of the grinder, and means is provided for rotating the gear relatively to the rolling means to bring new teeth into position to engage, or mesh with, the grinders, and the subsequent movement of the carriage and the rolling movement of the gear brings the new teeth into and out of engagement with the grinders.

1 is the base of the machine, and 2 designates the grinders, the grinders being here shown as wheels mounted on axles 3 journaled in bearings 4 supported on the base 1 of the machine, the grinders being arranged with their axes in a horizontal plane and at right angles to the plane of their respective grinding surfaces. The grinders are here shown as arranged with their axes inclined relatively to each other so that portions of their peripheries converge and run close together.

The grinders 2 are here shown as enlarged dished disks, which form the body portions thereof, and segments 5 of grinding or abrading material mounted on the edges of the disks and detachably secured in position to side faces of the disks by segmental clamping plates 6, Figs. 4 and 6, which are held in position by screws 7 extending transversely through the plates 6 and through the body portion or disks.

The abrading segments 5 project beyond the peripheral edge of the disks, and the segments of the grinders are separated at the point the grinders run closest together, such distance as to enter into the spaces on opposite sides of a single tooth of the gear being ground, the segments being arranged to engage their outer side faces simultaneously with the dissimilar or the front and rear working faces of alternate teeth of the gear.

Figure 3:
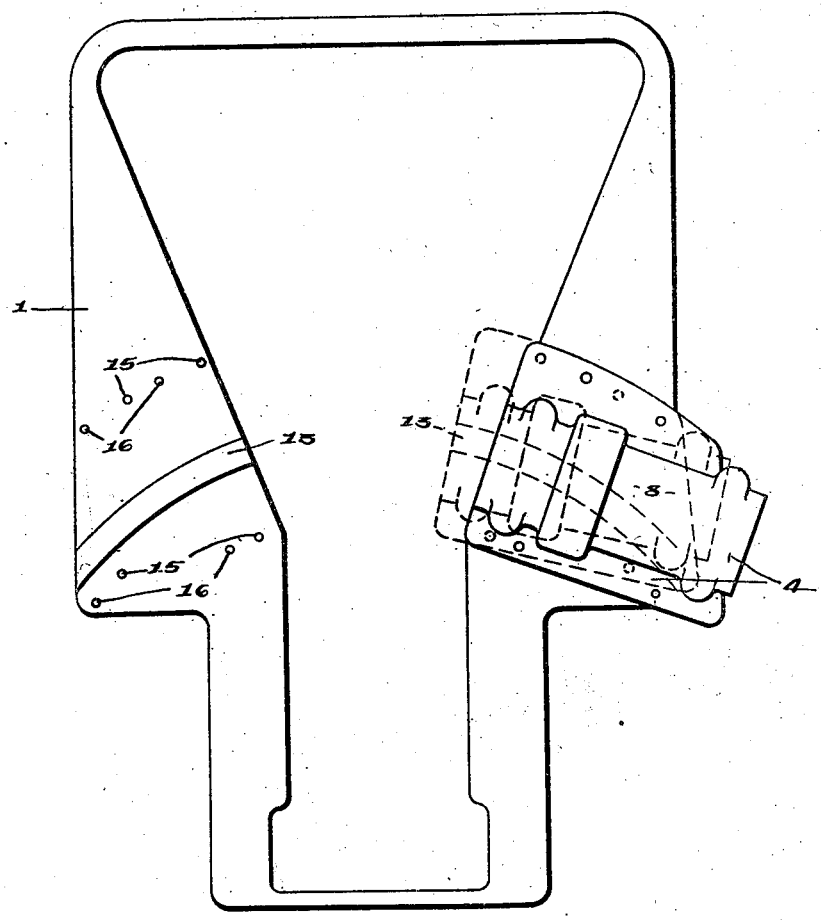
Fig. 3 is a plan view of the bed of the machine, the bearing for one of the grinders being also shown.

The bearings 4 are in upper and lower sections, the upper section 8 being clamped to the lower section, as by cap screws 9, and suitable bushings 10, 11 surround the axles 3 within the bearings 4. Each bushing 10 has a collar 10$^a$ threading thereon and located in an annular channel in the sections of the bearings 4. These collars 10$^a$ take the thrust of the axles. Each bushing 10 abuts at one end against a shoulder 10$^b$ on the axle and grinder, and nuts 3$^a$ screw on the axle against the other end of the bushing 10. By loosening the nuts 3$^a$ and turning the collar 10$^a$, an axial adjustment of the grinder is effected. Pulleys 12 are mounted on the outer ends of the axles by means of which power is applied to the grinders 2. The bearings 4 are adjusted in an arc in order to change the angle of inclination of the axes of the grinders 2 to adjust the position of the grinders to grind teeth of different pressure angles; and, as here shown, the base is formed with arc shaped tongues 13 Fig. 3 which fit into complemental grooves in the lower sections of the bearings 4, and the lower sections of the bearings 4 are secured to the base by cap screws 14 adapted to enter any one of the plurality of pairs of holes 15, 16. The grinders 2 are inclosed by a suitable casing 17 mounted on the base 1.

The gear 18 is supported with its axis at an angle to the plane containing the axes of the wheels or grinders 2, and as the axes of the grinders are in a horizontal plane, and as the gear 18 is a spur gear, said gear 18 is supported with its axis at a right angle to the horizontal plane containing the axes of the grinders 2.

In this embodiment of my invention, the rolling operation simulating the intermeshing of a gear with a rack is effected by moving the gear transversely of the grinders in a horizontal direction and rolling the gear during travel of the carriage, the turning of the gear being determined by the movement of the carriage, that is, the carriage is the prime mover in actuating the gear about its axis.

19, Figs. 1, 5, 6, 7 and 8, is the gear carriage slidable transversely of the base 1 in suitable ways provided on a frame or carriage 20 supported on the front portion of the base 1, the carriage 19 including a gear support as a spindle or mandrel 21 upon which the gear is mounted. As here shown, the carriage is rectangular in general form and slides at its lower side in horizontal ways or grooves formed in brackets 22 on the carriage 20, and at its upper side is formed with a way 23, Fig. 6, formed with an undercut face and movable along a complemental projecting guide 24 on the carriage 20. The ways 22, 23 are arranged above the gear out of the path of the dust made during the grinding operation. The spindle 21 rests at its lower end on a step or center 25 carried by a yoke or horizontal bracket 26, Fig. 5, having an upwardly extending arm 27 moving in a tubular guide 28 supported by the carriage 19. The bracket 26 also has an eye 29 at its free end which receives a rod 30 depending from, and fixed in, a tubular guide 31 carried by the carriage 19. The upwardly extending arm 27, which is located in the guide 28, is formed with a rack 32 with which meshes a pinion 33 mounted on a spindle 34 journaled in the bearing 35 carried by the tubular guide 28, the shaft 34 being squared at one end for receiving a suitable tool by means of which the bracket can be raised and lowered. The guide 28 is split at its lower end and is clamped on the rod 27 by a clamping member 36. The eye 29 is clamped in position on the rod 30 in any suitable manner, as by a clamping screw 37.

The spindle 21, Fig. 6, upon which the gear is mounted, is carried in a suitable holder 38 which is journaled in a vertical bearing 39 in the carriage 19 and which extends at its upper end 40 above the bearing 39, the holder 38 being formed conical at 41 at its lower end and engaging a conical bearing face 42 at the lower end of the bearing 39.

The upper end of the holder 38 is journaled in an antifriction bearing 43. The two bearings 42, 43 serve to hold the holder 38 centered. The holder 38 is held from vertical displacement by means of nuts 44, 45, one of which bears against the upper face of one of the rings of the bearing 43. The spindle 21 is clamped in the holder by means of a split socket 46 which receives the upper end of the spindle 21, the socket having an outer conical surface 47 fitting a complemental surface on the inside of the holder 38, and the socket 46 is pulled upwardly to clamp the same on the spindle by means of a rod 48 extending lengthwise of the holder 38 within the same and fixed at its lower end to the socket and having at its upper end a threaded nut or wheel 49 screwing on the upper end thereof against the end face of the holder 38.

Obviously, the turning of the nut 49 to pull the rod 48 upwardly, will cause the socket 46 to be clamped on the spindle 21 and movement of the nut in the opposite direction will permit the socket 46 to move outwardly and release the mandrel 21. The gear is clamped on the mandrel by a nut 21ª.

Portions of the means for rolling the gear during the movement of the carriage, and for feeding the gear relatively to the rolling means, are mounted on the upper end 40 of the holder 38 above the carriage 19.

Figure 2:
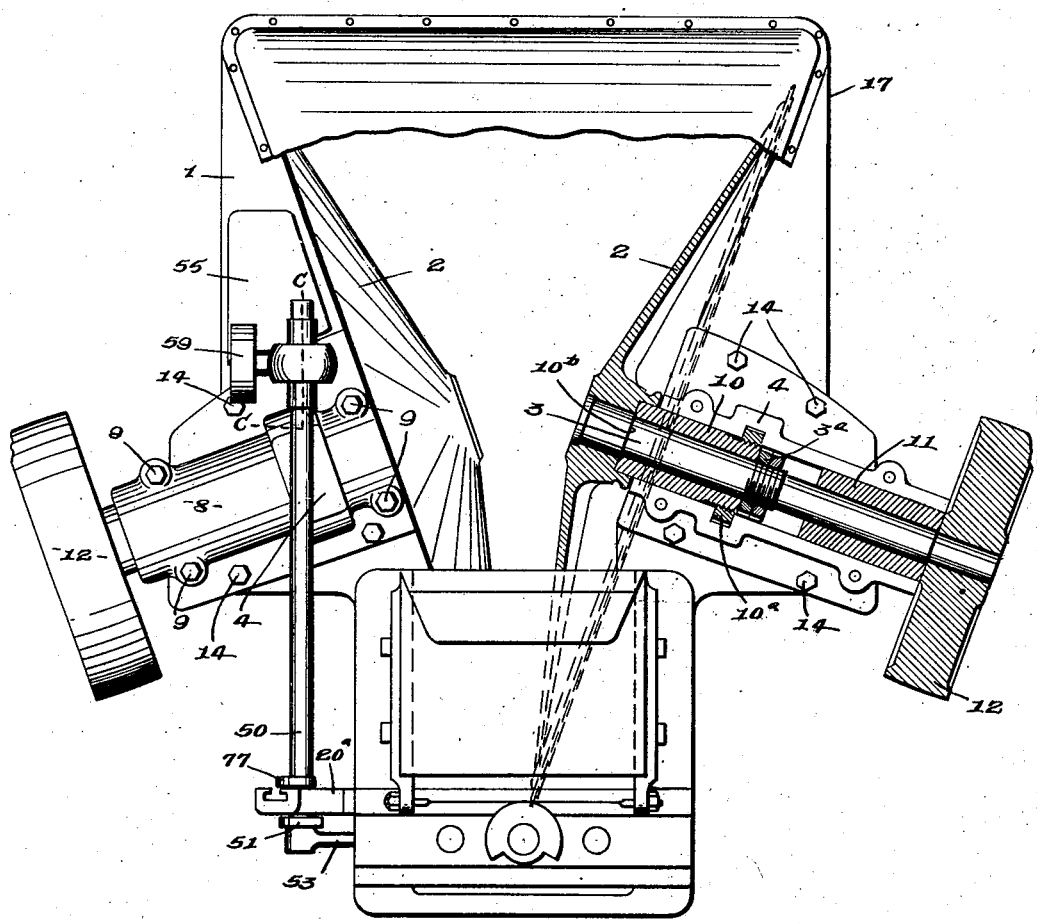
Fig. 2 is a top plan, partly broken away and partly in section, and parts being removed.

The means for reciprocating the carriage 19 is here shown as a shaft 50, Figs. 1, 2 and 5, extending forwardly and rearwardly of the machine at one side thereof and having a disk 51 at its front end on which is mounted an eccentric pin 52, the motion of the shaft being transmitted to the carriage 19 through a connecting rod 53 pivoted at one end on the pin 52 and at its other end at 54 to the carriage 19. The bearing for the front end of the shaft 50 is carried by the bracket 20ª on the frame or carriage 20, and the bearing for the rear of the shaft 50 is carried at the upper end of the standard 55 mounted on the base 1, the standard 55 also having a bearing for a shaft 56 having a worm gear 57, Figs. 12 and 13 thereon meshing with the worm 58 on the shaft 50. The shaft 56 is also provided with a pulley 59 at its outer end by means of which power can be applied to the shaft 50.

The worm gear 58 is held from endwise movement in any suitable manner in its bearing, Fig. 12, and the shaft 50 is slidable endwise therein in order to permit of the forward and rearward adjustment of the carriage 20, as will be presently described. As seen in Figs. 12 and 13, the shaft 50 is formed with a lengthwise keyway 50ª, and the gear 58 is provided with a key or pawl 58ª pivoted thereto and having its free end taking into the keyway. The pawl is arranged to clutch the shaft 50 and gear 58 together when the gear is turning in its normal direction, and to permit the shaft to be turned relatively to the gear when the carriage is being reciprocated by hand, as when it is being positioned to place a new gear in proper relation to the grinders.

The means for rolling the gear comprises a rocking part mounted concentric with the gear 18, that is, mounted on the holder 38, and means coacting with said part during movement of the carriage to rock said part, and hence rock or roll the gear 18, said means coacting with the rocking part at a point removed from the center thereof a distance equal to the pitch circle of the gear being ground.

As here shown, the means for causing the gear to have a rolling action during the travel of the carriage 19 comprises a roller 60, Figs. 1, 2, 5, 6, 9 and 10 mounted on the upper end 40 of the gear spindle holder 38, and normally connected thereto to rock the spindle 38, as will be hereinafter described, the roller being preferably of substantially the same radius as the pitch circle of the gear, and means engaging the periphery of the roller to cause the same to roll during the travel of the carriage 19, said means extending parallel to the path of the carriage 14. This means includes pairs of straps 61, 62 fixed at corresponding ends to brackets 63, 64 provided on the carriage 20, these straps 61 extending in opposite directions around the periphery of the roller and being here shown as secured thereto by rivets 65. The straps may, however, be continuous but the straps are secured to the roller, as the roller here shown is segmental, for the reason that it is necessary that the roller make only a small part of a revolution.

The straps are secured to the bracket 64 by suitable couplings 66, each coupling having a threaded portion extending through one or the other of the brackets 63, 64, and a nut 67 screwing thereon against the bracket. Each coupling also includes an equalizing lever 68 to the opposite ends of which the straps are pivoted.

The brackets 63, 64 are adjustably secured to the carriage 20, as seen in Fig. 1, and are clamped in position by cap screws 69 extending through slots 70 in said brackets and into the frame or carriage 20, this adjustment being for the purpose of arranging the straps substantially tangent to the roller 60 when different sizes of rollers are used, it being understood that different rollers are used for gears of different sizes, as each roller is preferably always of substantially the same radius as the pitch circle of the gear to be ground.

As best seen in Fig. 11, the means for feeding or shifting the gear 18 to bring new teeth thereof into grinding position, is here shown as a ratchet wheel 71 mounted concentric with the gear spindle holder 38 and normally fixed thereto to rotate the same (as will be hereinafter described), a shifting pawl 72 carried by a rocking support 73 and movable about the axis of the spindle 38, and means for actuating the support 73. Said means includes a rod 74, Fig. 5, connected to the rocking lever 75 supported by the bracket 20ª and pivoted between its ends thereto, the lever 75 coacting with a cam 77, Fig. 1, on the shaft 50. The lever 75 is shiftable along its pivot and also is adjustably connected at 78 to the rod 74 in order to adjust the rod endwise and regulate the throw of the pawl 72 to different ratchet wheels, as a ratchet wheel having the same number of teeth as the gear being ground is provided. These ratchet wheels are the same diameter, but the number of teeth thereof correspond to the number of teeth on the gear being ground. The ratchet wheel 71 is fixed to a carrier in the form of a disk 79 having a hub 80 formed with a conical bore, which snugly fits a taper on the upper end portion 40 of the holder 38, the disk being held in position by a nut 81, Fig. 6.

The holder 38 for the gear spindle 21, the roller 60 and ratchet wheel 71 are normally held to act as a unit during the grinding operation by means here shown as a disk 82 carried on the disk 79 beneath the ratchet wheel 71 and having a peripheral rack 83, and a lock 84 movable with the roller 60 and coacting with the rack 83. The lock 84, Fig. 11, is pivoted at 85 between its ends to a rock arm 86 movable with the roller 60, the lock 84 having its tail 87 arranged to engage a fixed shoulder 88 provided on the frame or carriage 20 in position to engage the tail 87 as the carriage 19 approaches the limit of each reciprocation. This movement of the lock moves the tooth 89 thereof out of engagement with the rack 83 permitting the ratchet wheel 71 to be fed by the pawl 72, the actuating cam 77 for the rod 74 and pawl 72 being timed to push the rod 74 forwardly to feed the ratchet wheel 71 just after the tail 87 of the lock 84 engages the fixed shoulder 88. The pawl carrier 73 is mounted on the hub 80 of the disk 79, and the rock arm 86 is provided with a hub 89 loosely mounted on the spindle holder 38 within the roller 60, the hub being keyed to the roller, Fig. 6.

The carriage 20 is shifted forwardly and rearwardly to adjust the machine to different size gears by means of the screw 91, Fig. 6, turning in a suitable threaded opening in the base 1, the screw being held from endwise movement relatively to the carriage in any suitable manner and having its outer end squared at 92 for receiving a suitable tool. A micrometer adjustment 93 is provided on the screw for determining the amount of adjustment of the carriage for the particular gear to be ground. The carriage is slidable along suitable ways 94 on the base 1.

As best seen in Figs. 7 and 8, the machine is provided with means for determining the position of gears on the carriage 19 and the spindle 21 after the proper position of the first gear has been determined. Said means comprises a stop for limiting the carriage in a predetermined position preferably its central position, that is, its position occupied when both grinders are engaged equally or to the same extent with two teeth of the gear, and a gage or aliner adjustable to intermesh teeth thereof with teeth of the gear.

96 is the stop pivoted at 97 to a bracket 98 projecting from the carriage 20, the stop being movable on its pivot into and out of the path of the carriage 19. 99 is the gage or aliner including a bracket 100 pivoted at 101 to the carriage 20 and carrying a rack 102, the teeth of which are of the same pressure angle as the teeth of the gear, that is, the teeth of the rack mesh accurately with those of the gear, the rack being adjustable relatively to the pivot 101 to be brought into position to mesh with the first gear of a batch. As here shown, the rack slides in a way 103 formed in the bracket 100 and is held in its adjusted position by clamping screws 104.

In operation, the first gear of a batch is placed on the spindle 21 and the carriage 19 reciprocated by hand by turning the shaft 50, the pawl 58ª, Figs. 12 and 13, permitting this result. The carriage 19 is reciprocated against the stop 96 which has been previously placed in operative position. The gear is then turned on the spindle 21 until two of its teeth are engaged to the same extent with both grinders and the gear tightened on the spindle by tightening the nut 21ª.

The aliner is then swung so that the rack will engage the opposite side of the gear to that engaged by the grinders and the rack adjusted to properly mesh with said gear.

Each subsequent gear, after the position of the carriage 19 has been determined by the stop 96, is turned until the rack 102, the position of which has been determined from the first gear, meshes with the subsequent gear.

To be theoretically accurate, the rack in order to coact accurately with gears of different sizes should move about an axis at a right angle to the axis of the gear, so that the rack moves in substantially the plane of the gear, but in practice the gage pivoted as shown is accurate.

This machine is also preferably provided with means for trimming the outer sides and peripheries of the abrading segments 5 of the grinders to grind the faces of the teeth of the gear of the desired curvature and pressure angle, and to trim off the peripheries of the segments so that the grinders will extend the proper distance between the teeth. This trimming means includes a frame 106, Figs. 14 to 17, pivoted at 107, see Fig. 5, to the carriage 20 at one side thereof, a carriage 108 supported by the frame 106 and trimmers or cutters supported by the carriage 108. The frame 106 is movable on its pivot into and out of position to bring the trimmers or cutting tools into operative relation to the grinders, and is held in its operative position by a clamping screw 109 which turns into a threaded opening in the carriage 20, Fig. 14. The carriage 108 slides in suitable ways on the frame 106 and is moved to its adjusted position by means of a screw 110 threading into the frame 106 and having a hand wheel 111 at its outer end.

The cutting tools are supported by a second carriage 112, Figs. 16 and 17, the carriage 112 carrying cutting tools for trimming the outer side faces of the segments 5 and also for trimming the perpheries thereof. The cutting tools for engaging the side faces are here shown as diamond points 113 carried by supports 114, which are pivoted at 115 to the carriage 112, and which carry the points 113 near their free ends. Means is provided for moving the supports on their pivots to wipe the points across the side faces of the abraders. Each support is here shown as T shape in general form and the pivots thereof are located at opposite ends of the head of the T and the point 113 is carried near the lower end of the leg of the T and extends laterally therefrom. By moving these supports about their pivots 115, the points 113 are moved back and forth over the outer side faces of the segments 5 trimming the surfaces thereof flat to a determined depth and pressure angle.

The point 116 for trimming the peripheries of the segments 5 is carried by a rock arm 117 mounted on a spindle 118 journaled in the carriage 112 and is movable horizontally as the arm 117 rocks against the periphery of the segments of one or the other of the grinders 2. The movement of the supports 114 and of the arm 117 is effected by means of a screw 119 journaled in the carriage 112 and held from endwise movement relatively thereto, and coacting with a block 120 which is connected by links 121 to the T supports 114 between the upper and lower ends of the supports 114, the links being connected to the block and to the legs of the T supports by ball-and-socket joints 122, 123. The block 120 is connected to the rock arm 117 to actuate the same by means of an arm 124 extending laterally from the block 120, and connected to the arm 125 extending laterally from the lower end of the shaft 118, by a pin-and-slot connection 127. The screw 119 is provided with a hand wheel 129.

Obviously, as the frame 106 is swung into operative position and the screw 110 operated by the hand wheel 111 to properly position the carriage 108, the cutters 113 and 116 will be moved into engagement with the abrading segments 5 of the grinders 2, and as the hand wheel 129 is turned, the cutters or trimmers 113 will be moved back and forth over the outer side faces of the segments as the grinders 2 rotate, and at the same time, the tool 116 will be moved laterally across the peripheries of the abrading segments.

An individual carriage 112 with its cutters is provided for each pressure angle and the trimmers or cutters thereof are properly set to cut the faces of the segments to the predetermined pressure angles at right angles to the axes of the respective grinders previously adjusted, this carriage 112 being detachably secured to the carriage 108 by screws 132, Fig. 15, which extend through openings 133 into the base of the carriage 112 and thread into the carriage 108. Suitable gages 134 are provided for determining the amount of movement inwardly of the carriage 108 by the screw 110, there being a gage or distance piece provided for each size of the gear, and the gage or distance piece is inserted between a color or shoulder 135 on the carriage, Fig. 17, and the opposing face of the frame 106.

The cutters or points 113, 116 are suitably clamped in split bearings 130 provided in each support 114 and in the arm 117, these split bearings being clamped by screws 131.

In the operation of the machine, after the grinders have been trimmed a gear is placed and alined on the spindle 21 as described, and power applied to the grinders 2 and the shaft 50, the carrage 19 is reciprocated rolling the gear so that teeth thereof engage with the grinders 2, this rolling action being due to the movement of the carriage and to the rotation of the gear effected by the roller 60 and straps 61, 62. At the end of each reciprocation of the carriage, the tail 87 of the lock 84 engages the fixed shoulder 88 moving the lock out of engagement with the rack 83, and thereupon the rod 74 is actuated by the rocking lever 75 and cam 77 to actuate the pawl carrier 73 and hence cause the pawl to shift the ratchet wheel 71 and gear spindle support 38 to rotate the gear relatively to the roller 60 to bring new teeth into position to be ground during next reciprocation of the carriage.

Owing to the large grinding surface due to the segments 5 on the large disks, the segments do not become heated or rather are not brought into engagement with gears while heated, as they have ample time to cool. Furthermore, owing to the large grinders and the casing inclosing the same, air is circulated and blown on the gear being ground so that it is unnecessary to grind the same in water.

What I claim is:—

1. A gear grinding machine comprising a pair of grinding wheels opposed to each other and arranged with their axes inclined with respect to each other so that their working faces are in the planes of the pressure angles of the teeth of the gear to be ground and at right angles to the axes of the grinding wheels, and a gear carriage arranged to support the gear with its axis standing at an angle to the plane containing the axes of the grinder so that the teeth thereof are engaged with the grinders and the grinders extend between teeth of the gear and the working faces thereof are engaged with dissimilar faces of alternate teeth of the gear, substantially as and for the purpose set forth.

2. A gear grinding machine comprising a plurality of grinders rotatable about fixed axes and arranged with their axes inclined so that portions of their rims run close together, the outer side faces of the grinders at the points they run nearest together being arranged in the planes of the pressure angles of the teeth of the gear being ground and at right angles to said inclined axes, the grinders being adjustable to change the inclination of their axes, substantially as and for the purpose set forth.

3. A gear grinding machine comprising a plurality of grinders rotatable about fixed axes, a gear carriage arranged to support the gear with teeth thereof engaged with the grinders, the grinders extending between teeth of the gear, and means for rolling the gear while engaged with the grinders, substantially as and for the purpose described.

4. In a gear grinding machine, a frame, a pair of grinding whels journaled in fixed bearings in the frame and arranged with their axes inclined so that portions of their rims run close together, the outer side faces of the rims being arranged at a right angle to the axes of the grinders, respectively, a gear carriage arranged to hold a gear with teeth thereof engaged with the outer faces of the rims of the grinders, and means for actuating the gear carriage to roll the gear during grinding operation, substantially as and for the purpose specified.

5. A gear grinding machine comprising a plurality of grinders rotatable about fixed axes, a gear carriage arranged to support the gear with teeth thereof engaged with the grinders and with the grinders extending between teeth of the gear and engaging dissimilar faces of alternate teeth of the gear, and means for rolling the gear during the grinding operation, substantially as and for the purpose set forth.

6. In a gear grinding machine, a frame formed with fixed bearings, grinding wheels having axles journaled in the bearings, the bearings being arranged inclined relatively to each other whereby portions of the rims of the wheels converge and run near each other, and the bearings being adjustable to change the angles of the axes of the grinding wheels, and a gear carriage arranged to hold a gear with the working faces of teeth thereof engaged with the outer sides of the rims of the grinding wheels at the point the wheels run nearest together, substantially as and for the purpose described.

7. In a gear grinding machine, a frame formed with fixed bearings, grinding wheels having axles journaled in the bearings, the bearings being arranged inclined relatively to each other whereby portions of the rims of the wheels converge and run near each other, and the bearings being adjustable to change the angles of the inclinations of the axes of the grinding wheels, the outer side faces of the rims of the wheels being arranged in planes at right angles to the axes of the wheels, respectively, a gear carriage arranged to hold a gear with the working faces of teeth thereof engaged with the outer sides of the rims of the grinding wheels at the point the wheels run nearest together, and means for rolling the gear during the grinding operation, substantially as and for the purpose specified.

8. A gear grinding machine comprising a plurality of grinders, a gear carriage arranged to support the gear with teeth thereof engaged with the grinders, the grinders extending between teeth of the gear, means for moving the carriage crosswise of the rims of the grinders, and means for moving the gear about its axis during movement of the carriage, substantially as and for the purpose set forth.

9. A gear grinding machine comprising a plurality of grinders, and a gear carriage arranged to support the gear with teeth thereof engaged with the grinders, the grinders extending between teeth of the gear, the grinders being engaged respectively with front and rear faces of different teeth of the gear, means for moving the carriage crosswise of the grinders, and means for moving the gear about its axis during said movement of the carriage, substantially as and for the purpose described.

10. In a gear grinding machine, a grinding wheel, a gear carriage arranged to support a gear with its axis at an angle to a plane containing the axis of the grinding wheel, the carriage being arranged to position the gear so that the rim of the grinding wheel projects between teeth of the gear, means for moving the carriage crosswise of the rim of the grinder, and means for moving the gear about its axis during the movement of the carriage, substantially as and for the purpose specified.

11. In a gear grinding machine, a rotating grinder, a gear support arranged to hold the gear with a working face thereof engaged with the grinder, and with the grinder extending between teeth of the gear, means for rolling the gear during the grinding operation, the rolling movement carrying the gear into and out of engagement with the grinder, and means for additionally moving the gear about its axis when the gear has been rolled out of engagement with the grinder, substantially as and for the purpose set forth.

12. In a gear grinding machine, a grinder, a gear carriage arranged to hold the gear with a side face of a tooth thereof engaged with the grinder, a portion of the grinder extending between teeth of the gear, the carriage including a spindle upon which the gear is mounted, means for moving the carriage to carry the gear into and out of engagement with the grinder, and means for rotating the spindle when the gear is disengaged from the grinder, substantially as and for the purpose described.

13. In a gear grinding machine, a grinder, a gear carriage arranged to hold the gear with a working face of a tooth thereof engaged with the grinder, a portion of the grinder extending between teeth of the gear, the carriage including a spindle upon which the gear is mounted, means for moving the carriage to carry the gear into and out of engagement with the grinder, and means for rotating the spindle when the gear is disengaged from the grinder, said means comprising a ratchet wheel connected to the spindle to rotate the same, the ratchet wheel being movable with the carriage, a feeding pawl coacting with the ratchet wheel and means for actuating the pawl when the carriage has been moved to carry the gear out of engagement with the grinder, substantially as and for the purpose specified.

14. In a gear grinding machine, a grinder, a gear carriage arranged to hold the gear with a side face of a tooth thereof engaged with the grinder, a portion of the grinder extending between teeth of the gear, the carriage including a spindle upon which the gear is mounted, means for moving the carriage to carry the gear into and out of engagement with the grinder, and means for rotating the spindle when the gear is disengaged from the grinder, said means comprising a ratchet wheel arranged concentric with the spindle and connected thereto to rotate the same, a feeding pawl coacting with the ratchet wheel, a lock movable with the carriage and normally connected to the ratchet wheel to hold the same from movement, means arranged in the path of the lock to move the lock out of operative position when the gear has been moved out of engagement with the grinder, and means for actuating the pawl to feed the ratchet wheel when the lock has been moved out of operative position, substantially as and for the purpose set forth.

15. In a gear grinding machine, a grinder, a gear carriage arranged to hold the gear with a side face of a tooth thereof engaged with the grinder, a portion of the grinder extending between teeth of the gear, the carriage including a spindle upon which the gear is mounted, a holder for the spindle, means for reciprocating the carriage, a rocking part mounted on the holder and normally connected thereto to rock the same, means for actuating said part during the movement of the carriage for rocking the holder to roll the gear into and out of engagement with the grinder during the movement of the carriage, means for shifting the holder independently of said part when the gear is disengaged from the grinder, the last mentioned means comprising a ratchet wheel arranged concentric with the holder and connected thereto to rotate the same, a feeding pawl coacting with the ratchet wheel, a lock movable with the rocking part and arranged to normally prevent movement of the ratchet wheel and holder relatively to the rocking part, and an unlocking device arranged to engage the lock and move the same out of operative position at the end of each reciprocation of the carriage, substantially as and for the purpose described.

16. In a gear grinding machine, a frame, a grinder supported by the frame, a gear carriage arranged to hold the gear with a working face of a tooth thereof engaged with the grinder, means for moving the carriage crosswise of the grinder, a roller carried by the gear carriage coaxially with the gear and normally connected to the gear to move the gear about its axis, and a strap connected to the frame and extending parallel to the direction of movement of the carriage part way around the periphery of the roller and being secured to the roller, substantially as and for the purpose specified.

17. In a gear grinding machine, a frame, a grinder supported by the frame, a gear carriage arranged to hold the gear with a working face of a tooth thereof engaged with the grinder, means for moving the carriage crosswise of the grinder, a roller carried by the gear carriage coaxially with the gear and normally connected to the gear to move the gear about its axis, and straps extending parallel to the direction of movement of the carriage and having corresponding end portions extending around the roller in opposite directions, and their other end portions secured to the frame, substantially as and for the purpose set forth.

18. In a gear grinding machine, a frame, a grinder supported by the frame, a gear carriage arranged to hold the gear with a working face of a tooth thereof engaged with the grinder, means for moving the carriage crosswise of the grinder, means for moving the gear about its axis during the movement of the carriage including a roller carried by the gear carriage coaxially with the gear and normally connected thereto to move the gear about its axis and being of the same radius as the radius of the pitch circle of the gear, and straps extending parallel to the path of the carriage and having portions extending in opposite directions around the roller, the straps being connected at their opposite ends to the frame, substantially as and for the purpose described.

19. In a gear grinding machine, a grinder, a gear carriage arranged to hold the gear with a working face of a tooth thereof engaged with the grinder, means for moving the carriage crosswise of the grinder, a roller carried by the gear carriage coaxially with the gear and being normally connected to the gear to move the gear about its axis, the roller being of the same radius as the pitch circle of the gear, means engaging the periphery of the roller to roll the same during the movement of the carriage, a support for the carriage movable relatively to the grinder to position the carriage to hold different size gears to the grinder, and a part to which said means is attached, the part being adjustable to arrange the said means tangent to the roller, substantially as and for the purpose specified.

20. A gear grinding machine comprising a base, a grinder mounted on the base, a gear carriage arranged in juxtaposition to the grinder and means for supporting the carriage, said means being mounted on the base and engaging the carriage above the point the gear engages the grinder, substantially as and for the purpose set forth.

21. A gear grinding machine comprising a base, grinding means mounted on the base, a support mounted on the base, a gear carriage movable on the support crosswise of the grinder and having means for holding the gear to the grinder and for actuating said gear during grinding operation, the carriage and its support having interlocking ways located above the point the gear engages the grinder, substantially as and for the purpose described.

22. In a gear grinding machine, a grinder, a gear carriage arranged to hold the gear with teeth thereof engaged with the grinder, and means adjustable to the first gear when the carriage is in a predetermined position and movable into and out of engagement with subsequent gears to determine the position of the subsequent gears relatively to the grinders, when the carriage is in said position, substantially as and for the purpose specified.

23. In a gear grinding machine, a grinding wheel, a gear carriage including a spindle arranged to hold the gear with teeth thereof engaged with the grinder, the gear being adjustable when placed on the spindle to properly engage with the grinder, and means including a rack movable into and out of engagement with teeth of the gear and adjustable to mesh accurately with such teeth when the gear is positioned so that teeth thereof are in predetermined relation to the grinder, substantially as and for the purpose set forth.

24. In a gear grinding machine, a grinding wheel, a gear carriage including a spindle arranged to hold the gear with teeth thereof engaged with the grinder, the gear being adjustable when placed on the spindle to properly engage with the grinder, and means including a pivoted rack movable on its pivot into and out of engagement with teeth of the gear and adjustable to mesh accurately with such teeth when the gear is positioned so that teeth thereof are in predetermined relation to the grinder, substantially as and for the purpose described.

25. In a gear grinding machine, a movable grinder, a gear carriage arranged to hold the gear with teeth thereof engaged with the grinder, the carriage including a spindle upon which the gear is mounted and being movable to effect a rolling action of the gear during grinding operation, a stop movable into and out of position to limit the movement of the carriage when the carriage is at a predetermined position, and a gage for determining the initial position of gears after the correct position of the first gear has been determined when the carriage is against the stop, substantially as and for the purpose specified.

26. In a gear grinding machine, a movable grinder, a gear carriage arranged to hold the gear with teeth thereof engaged with the grinder, the carriage including a spindle upon which the gear is mounted and being movable to effect a rolling action of the gear during grinding operation, a stop movable into and out of position to limit the movement of the carriage when the carriage is at a predetermined position, and a gage for determining the initial position of gears after the correct position of the first gear has been determined when the carriage is against the stop, the gage including a rack, a support for the rack, the rack being adjustable relatively to the support to properly mesh with the first gear, substantially as and for the purpose set forth.

27. In a gear grinding machine, a movable grinder, a gear carriage arranged to hold the gear with teeth thereof engaged with the grinder, the carriage including a spindle upon which the gear is mounted and being movable to effect a rolling action of the gear during grinding operation, a stop movable into and out of position to limit the movement of the carriage when the carriage is at a predetermined position, and a gage for determining the initial position of gears after the correct position of the first gear of a batch has been determined when the carriage is against the stop, the gage including a rack, a pivoted support for the rack, the rack being adjustable relatively to the support to properly mesh with said first gear, substantially as and for the purpose described.

In testimony whereof, I have hereunto signed my name in the presence of two attesting witnesses, at Syracuse, in the county of Onondaga, in the State of New York, this 2nd day of February, 1914.

ALEXANDER T. BROWN.

Witnesses:
 CHAS. H. YOUNG,
 S. DAVIS.